US008065220B2

(12) United States Patent  
Blacher (10) Patent No.: US 8,065,220 B2  
(45) Date of Patent: Nov. 22, 2011

(54) FINANCIAL PRODUCT PRICING SYSTEM (76) Inventor: Guillaume Blacher, Londres (GB)

( * ) Notice: Subject to any disclaimer, the term of this patent is extended or adjusted under 35 U.S.C. 154(b) by 713 days.

(21) Appl. No.: 10/537,650

(22) PCT Filed: Dec. 5, 2003

(86) PCT No.: PCT/IB03/05680  
§ 371 (c)(1),  
(2), (4) Date: Jun. 30, 2006

(87) PCT Pub. No.: WO2004/053756  
PCT Pub. Date: Jun. 24, 2004

(65) Prior Publication Data  
US 2008/0133253 A1  Jun. 5, 2008

(30) Foreign Application Priority Data  
Dec. 6, 2002  (FR) ..................................... 02 15460

(51) Int. Cl.  
*G06Q 40/00*  (2006.01)

(52) U.S. Cl. ............................ 705/37; 705/35; 705/36 R (58) Field of Classification Search ............... 705/35–45  
See application file for complete search history.

(56) References Cited

U.S. PATENT DOCUMENTS

| 6,377,940 | B2 * | 4/2002 | Tilfors et al. ................... 705/37 |
| 6,456,982 | B1 * | 9/2002 | Pilipovic ....................... 705/36 R |
| 6,546,375 | B1 * | 4/2003 | Pang et al. ...................... 705/37 |
| 7,389,260 | B1 * | 6/2008 | McLean et al. .............. 705/36 R |
| 7,418,418 | B2 * | 8/2008 | Wizon et al. ................ 705/36 R |
| 7,467,108 | B2 * | 12/2008 | Papka .......................... 705/36 R |
| 2002/0019794 | A1 * | 2/2002 | Katz et al. ....................... 705/37 |
| 2002/0019795 | A1 * | 2/2002 | Madoff et al. .................. 705/37 |
| 2002/0042770 | A1 * | 4/2002 | Slyke et al. ..................... 705/37 |
| 2002/0198819 | A1 * | 12/2002 | Munoz et al. ................... 705/38 |
| 2003/0033261 | A1 * | 2/2003 | Knegendorf ................. 705/400 |
| 2003/0055775 | A1 * | 3/2003 | McQuain ........................ 705/37 |
| 2003/0177077 | A1 * | 9/2003 | Norman .......................... 705/35 |
| 2003/0229563 | A1 * | 12/2003 | Moore et al. .................... 705/37 |

FOREIGN PATENT DOCUMENTS  
JP  2004334480  * 11/2004

OTHER PUBLICATIONS

Rigobon, Roberto. The Impact of Monetary Policy on Asset Prices. Sloan School of Managment (MIT). Jan. 2002.*

* cited by examiner

*Primary Examiner* — Charles Kyle  
*Assistant Examiner* — Robert R Niquette  
(74) *Attorney, Agent, or Firm* — Woodcock Washburn LLP (57) ABSTRACT

A method implemented on a computing system for pricing a financial product comprises receiving data about the product. The received data may comprise contextual data indicating market variables involved in product pricing. The contextual data may comprise a valuation currency, an underlying instrument, and data including a set of events and flows associated with the product. The data is used to generate a schedule comprising an event or flow for each of a plurality of dates. The schedule is interpreted to generate a table of variables on the basis of events or flows, and for each date on the schedule, a function for calculating the product price as a function of the variables. A list of market variables that are generated by a market analysis are received. The variables are used to calculate product variable values. A product price is calculated as a function of the calculated product variable values.

18 Claims, 6 Drawing Sheets

PRODUCT NAME

CONVERT

SCHEDULE

| Date | Flow |
|---|---|
| 28-SEP-2002 | CONVERT PAYS 0.0150 * 100.0000<br>CONVERT = MAX(CONVERT, 100.0000 * SPOT (0.0000) / 6500.0000) |
| 28-SEP-2003 | CONVERT PAYS 0.0150 * 100.0000<br>CONVERT = MAX(CONVERT, 100.0000 * SPOT (0.0000) / 6500.0000) |
| 27-SEP-2004 | CONVERT PAYS 0.0150 * 100.0000<br>CONVERT = MAX(CONVERT, 100.0000 * SPOT (0.0000) / 6500.0000) |
| 28-SEP-2005 | CONVERT PAYS 0.0150 * 100.0000<br>CONVERT = MAX(CONVERT, 100.0000 * SPOT (0.0000) / 6500.0000) |
| 28-SEP-2006 | CONVERT PAYS 0.0150 * 100.0000<br>CONVERT = MAX(CONVERT, 100.0000 * SPOT (0.0000) / 6500.0000) |
| 28-SEP-2007 | CONVERT PAYS 0.0150 * 100.0000<br>CONVERT PAYS 100.0000<br>CONVERT = MAX(CONVERT, 100.0000 * SPOT (0.0000) / 6500.0000) |

FIG. 7

```
SCRIPT define Redempt=100
define coupon=1.5%
define ConvPrice=6500
define Conv_Ratio(x)=100*x/ConvPrice
from '0y' to '5y' annually, convert pays coupon*100
fixing in '5y', convert pays redempt
from 0d to '5y' continuously, convert=max (Convert, Conv_Ratio(dax))
```

FIG. 8

FINANCIAL PRODUCT PRICING SYSTEM

CROSS REFERENCE TO RELATED APPLICATIONS

The present application is a national phase filing under 35 U.S.C. §371 of Patent Cooperation Treaty application PCT/IB03/05680 filed on Dec. 5, 2003, which claims priority to French patent application 0215460 filed on Dec. 6, 2002, the contents of all of which are hereby incorporated by reference in their entirety.

The invention concerns a financial product pricing system.

Financial products, and in particular derivative products, are subject to very strict regulation that requires financial establishments and commercial enterprises using them to price them as a function of a certain number of hypotheses, involving variables arising from the characteristics of the products in question and variables arising from the financial markets to which these products belong. These prices must be calculated for the purposes of valuation and also so that they can be incorporated into the required Financial Risk reports, in particular the VaR (Value at Risk). These "pricing" calculations must be updated very frequently—usually daily—which involves very cumbersome data processing.

In addition, many new financial products appear regularly. The analysis of each new product in order to calculate the price, the VaR, etc., is very cumbersome work, and most often requires developing a specific pricing model. This model is then integrated into the information processing systems used for the examination, processing, valuation, and calculation of risks. These systems are often different.

The invention aims to provide a system that makes it possible to simplify considerably the operations involved in pricing a financial product.

For this purpose, the object of the invention is a financial product pricing system consisting of interface means, data storage means, calculation means, and data processing means, a system that is remarkable in that:
 (a) the interface means consist of means for inputting data that identify and describe the product into the system, whereby these data consist of:
  (a1) contextual data of the product, consisting of at least one valuation currency and at least one underlying instrument,
  (a2) characteristic data of the product, consisting of a set of events and flows associated with the product;
 (b) the data processing means consist of means for generating a planned schedule from the identification and description data, in which an event and/or flow relating to the product is associated with each date;
 (c) the data processing means also include means for interpreting the schedule, in order to generate:
  (c1) a table of variables for the product on the basis of the events and/or flows,
  (c2) for each date of the planned schedule, a function for calculating the product price as a function of at least one of the product variables;
 (d) the interface means consist of means for inputting a list of market variables associated with the product and generated by a market analysis; and
 (e) the calculation means consist of means for calculating, for each of the market scenarios/states and for each of the dates, the product variable values according to the market variables, and means for calculating the product price as a function of the calculated product variable values.

According to one embodiment, the data processing means consist of means for generating a compact script containing all the data needed for product pricing.

According to another embodiment, the means for inputting data identifying and describing the product consist of means for inputting these data in compact script form.

According to another embodiment, the means for inputting data identifying and describing the product consist of acquisition windows, into which the contextual data and characteristic data can be entered separately.

According to another characteristic of the invention, the data processing means also include means for checking the interpretation of the schedule.

According to yet another characteristic of the invention, the calculation means consist of:
 (e1) means for calculating; for each of the market scenarios/states and for each of the dates, the value of each of the market variables,
 (e2) means for calculating, for each of the market scenarios/states and for each of the dates, the product variable values as a function of the market variable values,
 (e3) means for calculating the price as a function of the product variable values in all the market scenarios/states.

Other characteristics and advantages of the invention will become evident from the following description of an embodiment of the invention, illustrated by the attached drawings, in which.

Figure 1:
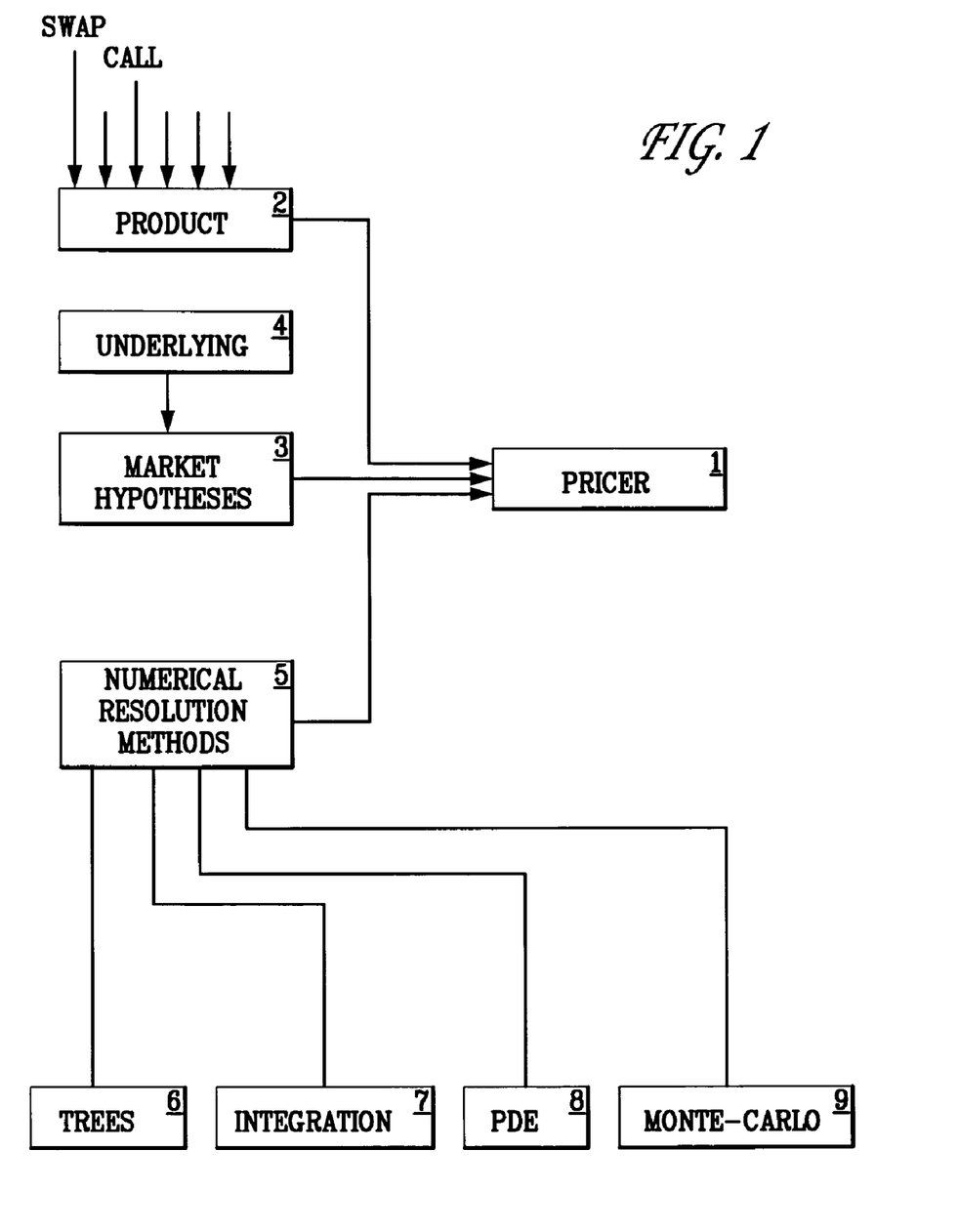
FIG. 1 is a functional block diagram illustrating the basic means used by the system according to the invention to describe a financial product and to price it.

Referring to FIG. 1, pricing a financial product using the system according to the invention involves the following data and means:
 a calculation tool called a pricer 1;
 product variables 2 that are a function of the nature of the financial product in question (for example, swap, call, etc.);
 market hypotheses 3 known to financial specialists (for example, normal, log-normal, mean reverting, multifactor, etc.) that depend, among other things, on the underlying instrument 4 (for example, share, bond, exchange rate, credit, etc.) attached to the product in question; these market hypotheses make it possible to determine the various market scenarios or states and the way in which these scenarios will be generated and modeled, whereby each scenario corresponds to a set of possible market variable values, a set that is used to price the financial product;
 calculation means consisting of numerical resolution methods known to financial specialists (for example, trees 6, integration 7, partial differential equations or PDE 8, the Monte Carlo method 9, etc.), which make it possible to price the product on the basis of the product variables and market hypotheses.

Figure 2:
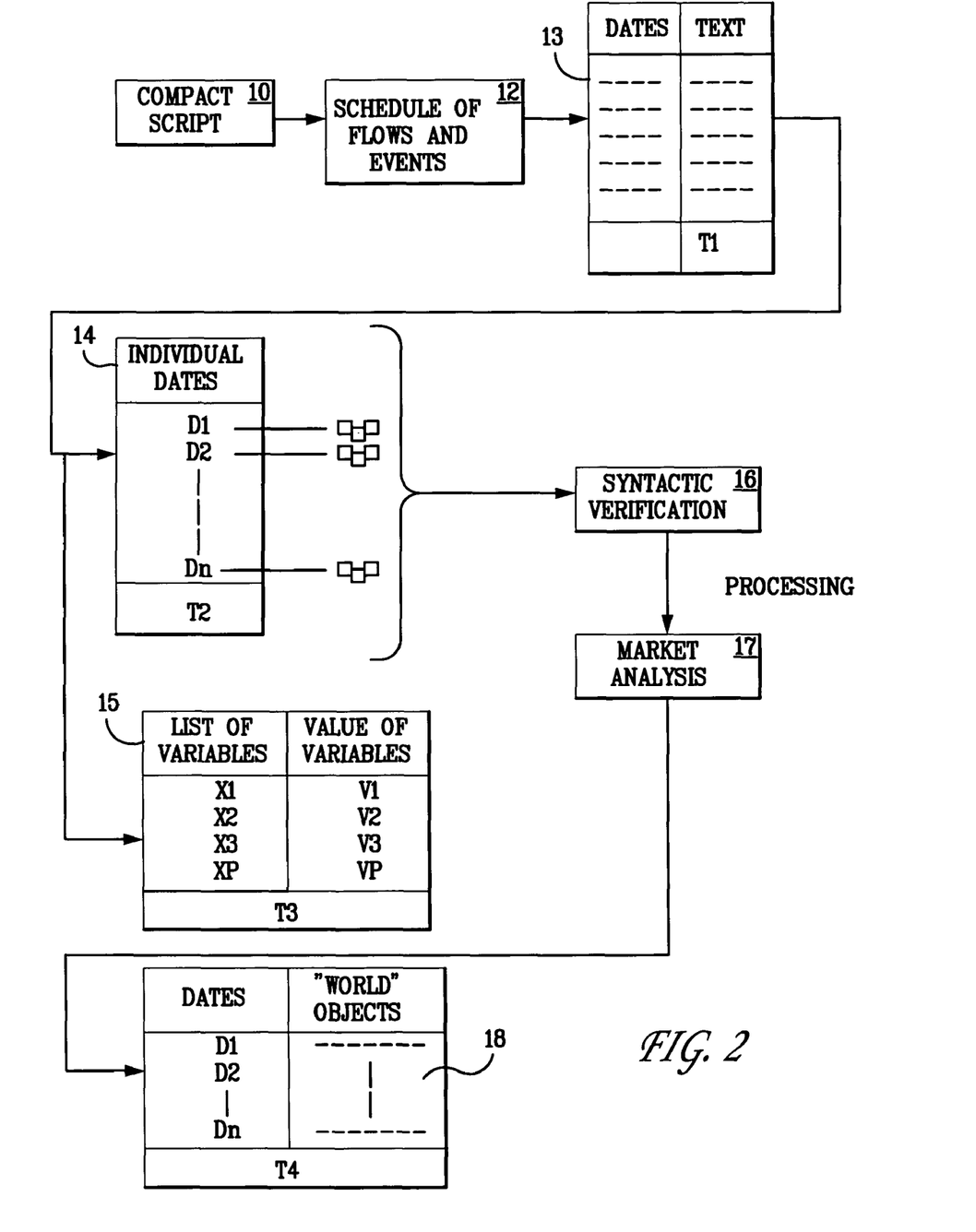
FIG. 2 is a functional block diagram illustrating the means and data needed to price a financial product by the system according to the invention.

According to FIG. 2, the system making it possible for a user to price a financial product first involves a description of the product. This first of all requires acquisition of the following, thanks to the system interface means:

contextual data of the product, that is, at least one valuation currency (making it possible to define all the conventions of the market or the place in question) and one or more underlying instruments (for example, rate curve, "share", exchange rate, etc.), that is, the market quantities used to define the product; these contextual data indicate what market variables will be involved in the product pricing and used for selecting market hypotheses;

characteristic data of the financial product in question. These data consist of a schedule of events and flows associated with the product.

Figure 6:
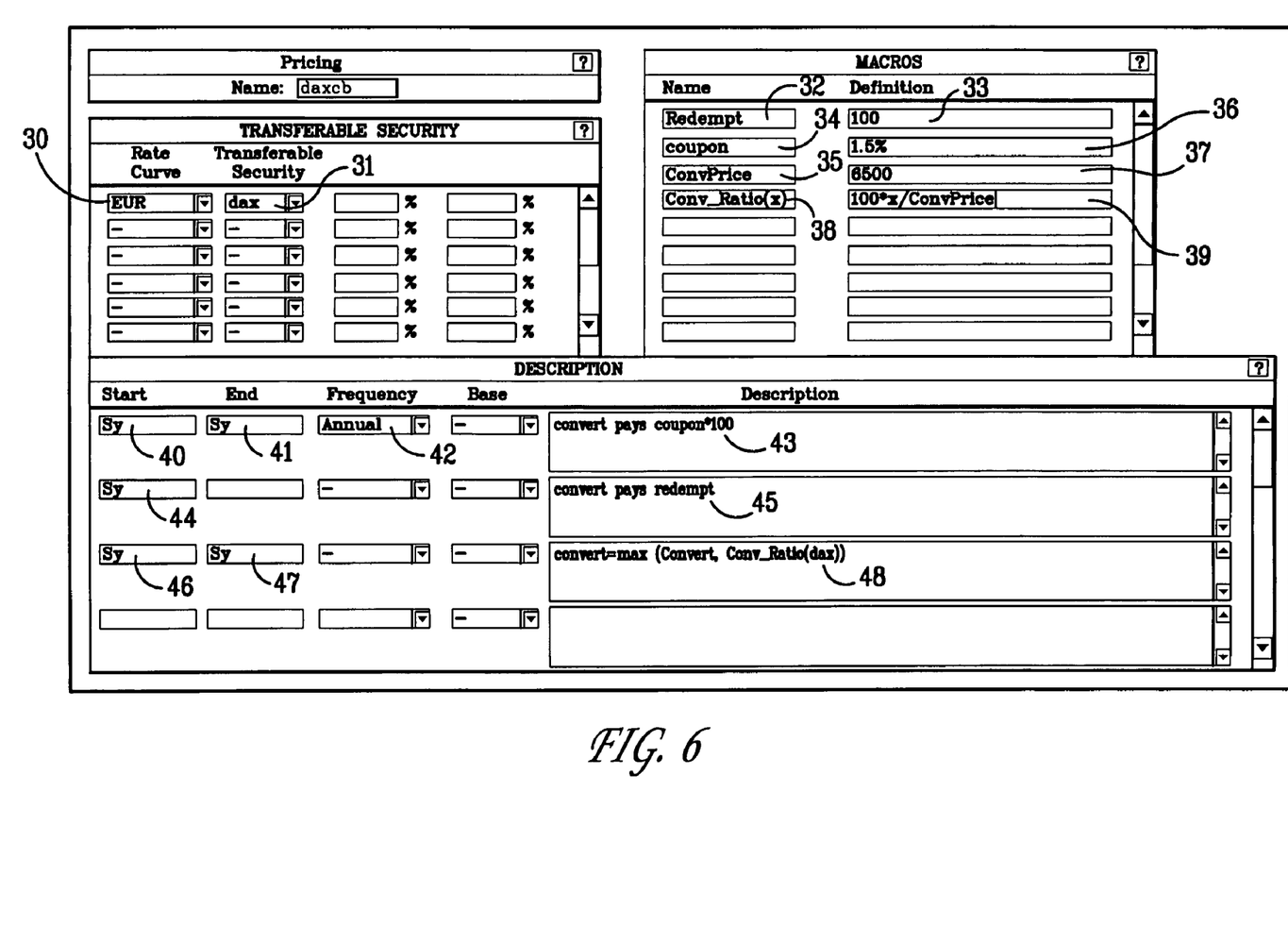
FIGS. 6 to 8 illustrate the computer acquisition windows for the information needed to describe a financial product according to the invention.
Figure 8:
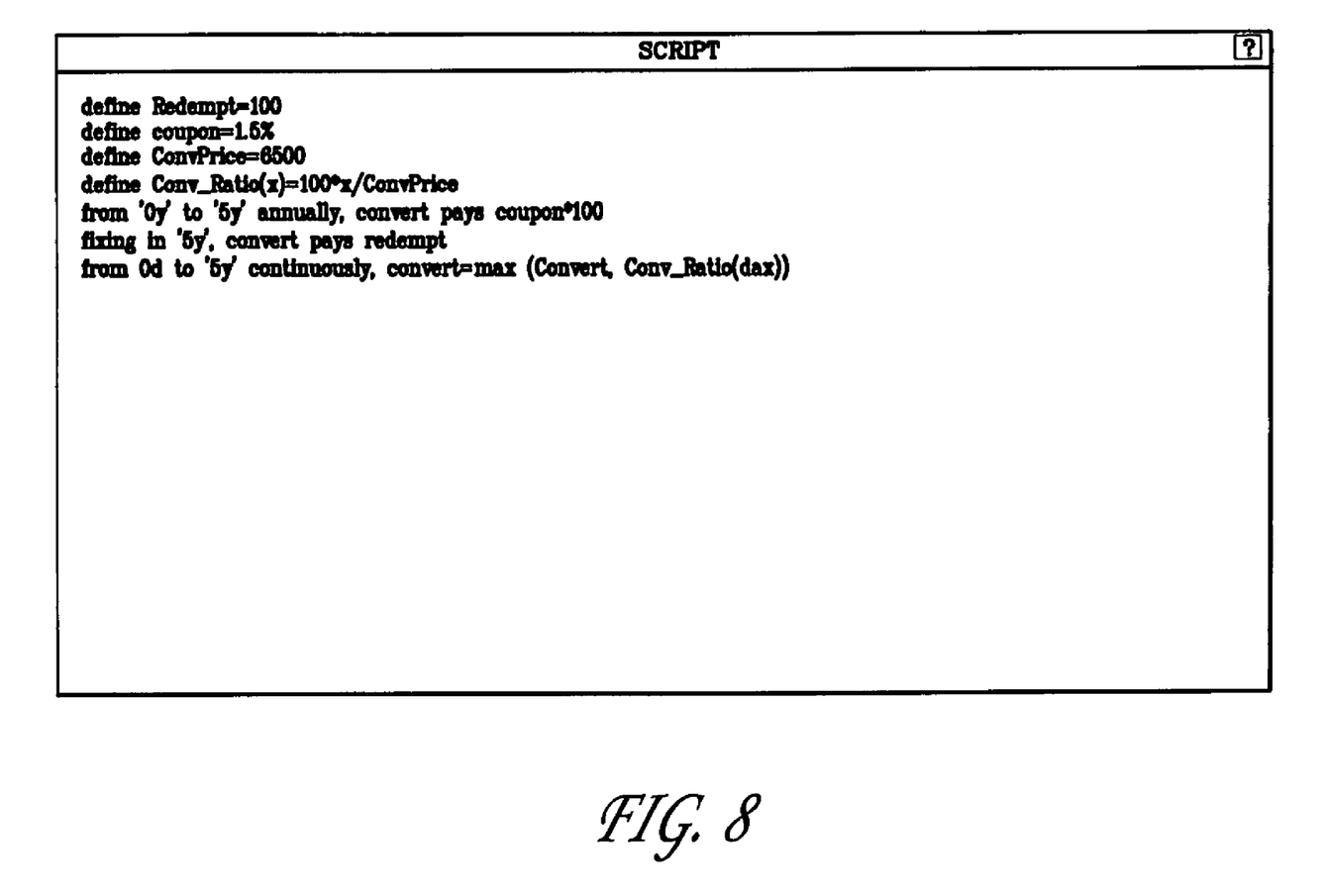

For this purpose, the user may either:

input a compact script 10 of the type shown in FIG. 8, which contains all the information (contextual data and characteristic data of the product) and will then be separated into different objects, each containing these two types of data, or input directly into separate windows the product contextual data on the one hand and characteristic data on the other, as illustrated by the acquisition screen in FIG. 6.

On the basis of these data describing and identifying the product, the data processing means of the system are used to generate a planned schedule at 13, that is, an exhaustive series of dates D1, D2 ... Dn, with an event and/or a flow relating to the product associated with each one (Table T1).

A table of objects T2 and a table of product variables T3 are constructed at 14 and 15, respectively, by means of a "parser".

Table T2 is an intermediate table that makes it possible to define and construct, for each date in question D1, D2 ... Dn, one or more evaluation trees representing a tree form of the function $Y_1 = f(t, x_1 \ldots x_n, Y_{t-1})$, in which:

$Y_1$ represents the current value of the product variable or variables;

t represents time;

$x_1 \ldots x_n$ represents the value of the market variables that will be identified at 17.

Table T3 is a list of product variables and the values associated with each of these variables, values that are updated by the evolution tree or trees of Table T2.

At 16 the system uses verification means to make sure of the consistency of the data of Table T2.

At 17, a market analysis is done in order to construct an objects table, "world" (T4). This table consists of a list of additional market information 18 that is needed at each of the dates D1 to Dn to price or evaluate the product.

These "world" objects are defined on the basis of a number of basic elements, four of which are especially important:

the spot (shares, raw materials, energy, indexes, etc.);

the exchange rate;

the interest rate, preferably represented by discount factors. This can also be zero-coupon rates, the Libor rate, a swap, etc.;

information on counterparty default; for example, has a bond defaulted? This may also involve a rate "spread" representing the credit risk.

Since the market variables at this stage are identified and Table T4 is constructed, construction of the evaluation trees of Table T2 is therefore achieved.

On the basis of the data obtained as described with reference to FIG. 2, the "pricer" 1 proceeds to calculate the price by applying one of the numerical resolution methods 5.

These financial numerical resolution methods (for example, trees 6, integration 7, partial differential equations or PDE 8, the Monte Carlo method 9, etc.), which are standard and well known to finance specialists, achieve the following:

simulate or explore possible values of market variables;

calculate the desired or future value of product variables.

Figure 3:
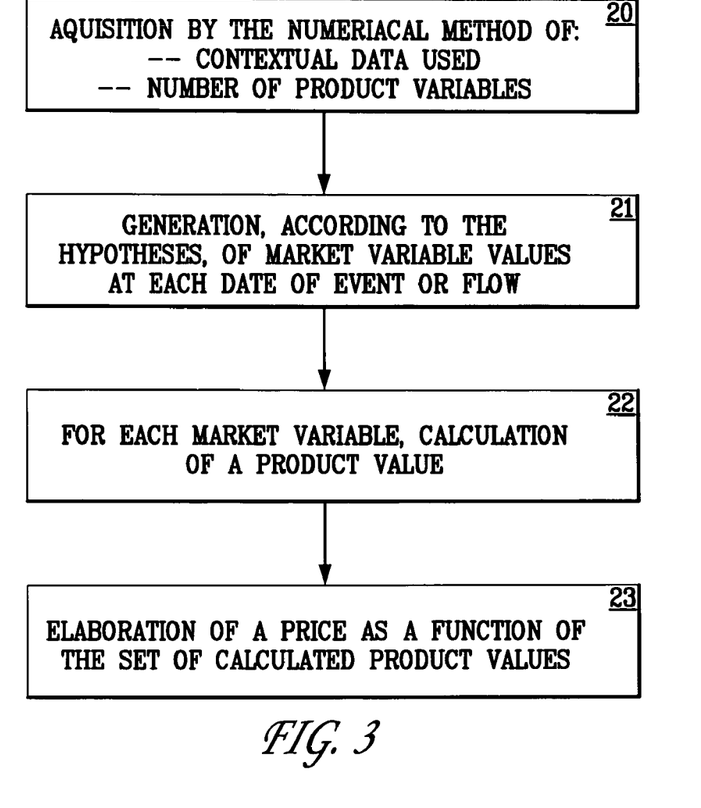
FIG. 3 is a functional block diagram illustrating the process for pricing a financial product using the system according to the invention.

The functional block diagram in FIG. 3 illustrates the numerical resolution of the product pricing problem. At 20, depending on the numerical resolution method 5 in question, acquisition of the contextual data used in the method (which have been obtained as described with reference to FIG. 2) and of the number of product variables is carried out.

Figure 4:
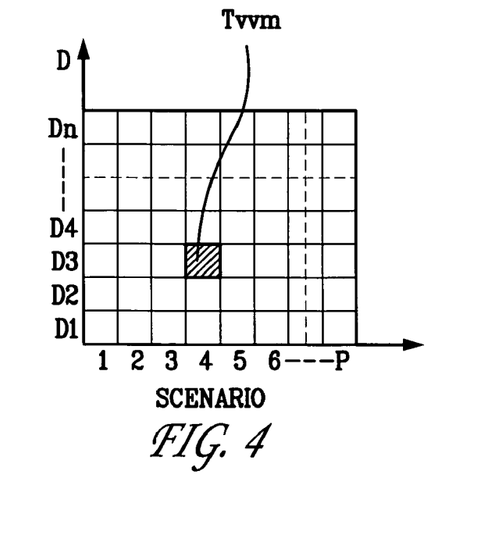
FIGS. 4 and 5 are tables illustrating the storage means needed for the pricing process of FIG. 3.

At 21, numerical resolution means generate the values of the market variables at each date D1, D2 ... Dn of the schedule according to the market hypotheses in question, as well as at each scenario established as a function of these hypotheses. As shown in FIG. 4, a table of market variable values Tvvm corresponds to each date and market scenario/state.

Figure 5:
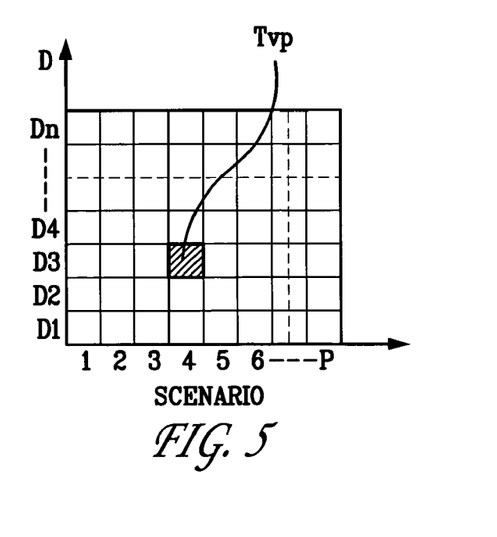

At 22, the numerical resolution means calculate the product variable values for each date and market scenario/state in question. As shown in FIG. 5, a table of product variable values Tvp corresponds to each date and market scenario/state in question.

At 23, the numerical resolution means finally produces a product price as a function of the set of calculated product variable values.

An example of implementing the mechanisms making it possible to identify and describe a financial product by its contextual data and its characteristic data as indicated at 10 and 12, in order to construct Table T1 in FIG. 2, will now be described in greater detail with reference to FIGS. 6 to 8, which represent acquisition windows of the product to be described.

These mechanisms make it possible to describe any structured financial product, independently of its underlying instrument or the structure or characteristics of its flows. These mechanisms have:

a syntax defining the type of phrase structure accepted and compressed;

a dictionary of predefined words that are "compressed";

the capacity to accept new words if they are suitably defined and introduced.

In the example that follows, a convertible bond will be defined. First, the market variables in question, that is, the currency and its "rate" curve and the pertinent "transferable security", in this case the DAX, are introduced into the windows 30 and 31 of FIG. 6.

It is necessary to describe the sum that the bond will pay at maturity if it is not converted. For this purpose, the term "Redempt" is introduced at 32, to designate the amount paid back at maturity. A numerical value is assigned to it at 33, in this case 100.

Likewise, "Coupon" and "ConvPrice" are introduced at 34 and 35, and their respective numerical values at 36 and 37.

In order to suitably define the product, the idea of "conversion ratio" must be introduced. This is done at 38 by indicating that "Conv_Ratio(x)" is equal to "100*(x)/ConvPrice" (window 39).

Then we must describe the product, that is, the flows that it will generate and the conditions of this generation if necessary.

In the hypothesis in question, the convertible bond pays a coupon (window (43) from any point of departure (window 40), at an annual frequency (window 42) for five years (window 41).

At the end of five years (window 44), the bond pays its redemption value (window 45).

The bond's conversion characteristic is expressed by the fact that at any time ("Od", window 46) during the five years (window 47), the value of the product is the maximum of the product value and its conversion ratio (window 48):

Convert=max(convert,Conv_Ratio(dax)).

These mechanisms also make it possible to very simply describe a convertible bond with particularly unusual characteristics.

Figure 7:
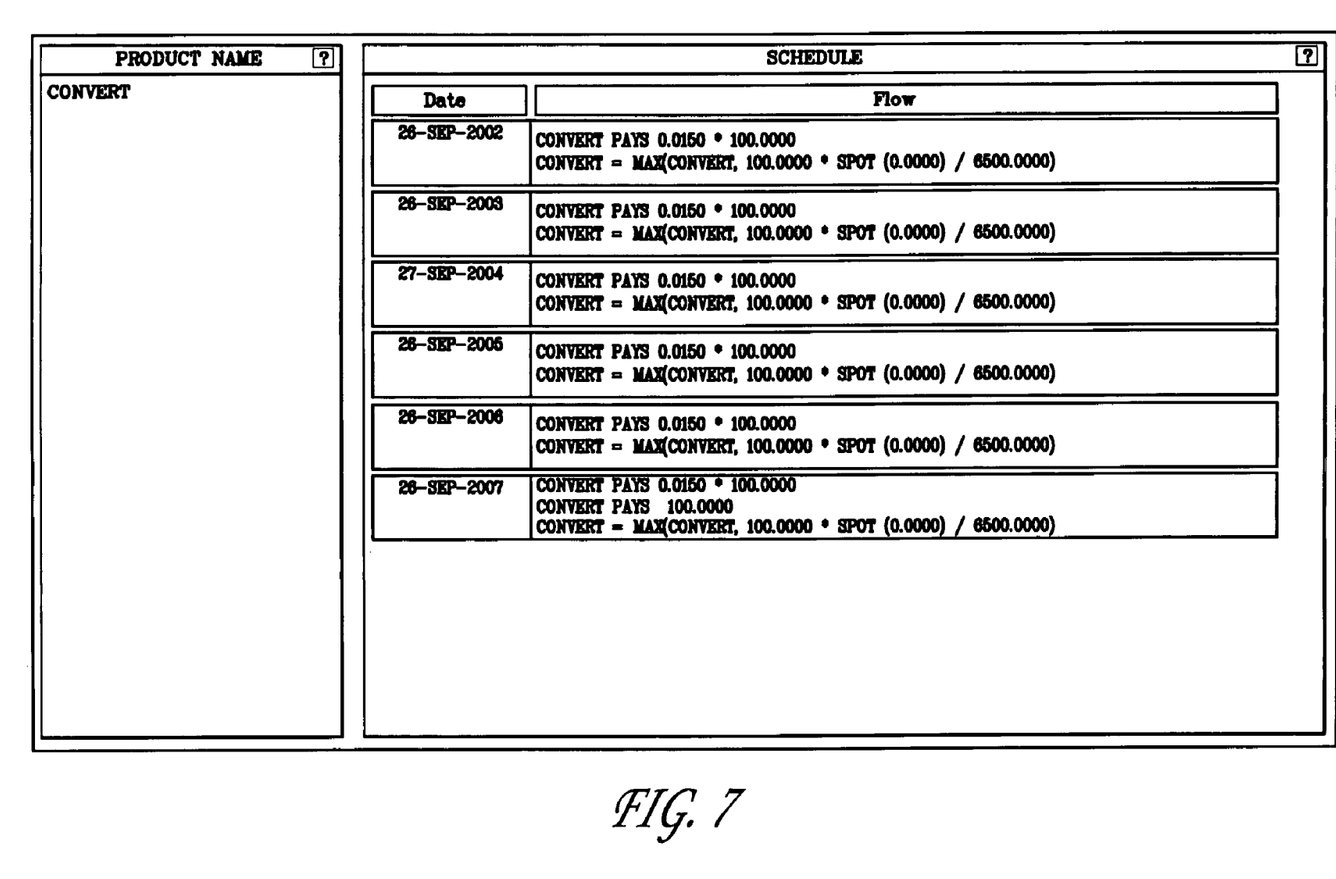

Thanks to the interface means, shown in FIG. 7, the system according to the invention generates and can then display the product flows based on the data introduced in the form of a preestablished format. This allows the user to make sure that the discounted flows are properly represented and captured by the system.

Finally, the data processing means make it possible for the system to generate a script (FIG. 8), that is, a code precisely describing the product characteristics and containing all the information necessary for pricing the product. The script, show in FIG. 8, can be exchanged among all the intervening parties to describe and price the product.

As a variant, all the information, that is, the contextual data and the characteristic data of the product in question, can be acquired by a user in the form of a compact script of the type shown in FIG. 8, which can then be broken down into different objects, each containing the product's contextual data and characteristic data.

Describing the product using windows, leading to the generation of a script that can be exchanged among and interpreted by different computers as described above, or directly in the form of a script, requires the user to use predefined words that are part of a dictionary that can be expanded, if necessary, and a syntax defining the type of phrase structure accepted and compressed.

The rules of syntax and the predefined vocabulary are given in an appendix, and an example of how to use this vocabulary and these rules of syntax is presented below. Thus the definition of the product value given in window 48:

Convert=max(convert,Conv_Ratio(dax))

is an assignment of variable using a function whose name is predefined "max", which is applied to two parameters:
the first parameter "convert" is a variable;
the second parameter "Conv_Ratio(dax)" makes use of a definition (of the macro function type) given in windows 38 and 39, which means that the expression "Conv_Ratio(dax)" should be replaced by the expression "100*dax/ConvPrice", in which "dax" is a variable and "ConvPrice" is an expression that should in turn be replaced by the numerical value "6500", because of the definition given it in windows 36 and 37.

The definition of window 48 uses a reserved vocabulary word "max", defined as being a function name. The set of reserved function names is defined in the grammar as follows:

```
FUNCTION_NAME=  "CONT"
              | "MAX"
              | "MIN"
              | "MAXINDEX"
              | "MININDEX"
              | "SQRT"
              | "LOG"
              | "EXP"
              | "MIN"
              | "ABS"
              | "INT"
              | "TERM"
              | "SPOT"
              | "FX"
              | "DF"
              | "LIBOR"
              | "SWAPRATE"
              | "LEVEL"
              | "ACCRUEDCOUPON"
              | "ACCRUALFACTOR"
              | "BLACKSCHOLES"
              | ("FIX_DATE" "FIXDATE")
              | ("START_PERIOD" "STARTPERIOD")
              | ("END_PERIOD" "ENDPERIOD")
              | ("PAY_DATE" "PAYDATE")
              | "CGV"
              | "START"
              | "END"
              | "NOW"
```

The definition of window 48 also uses the following rules of syntax:

definition of an assignment:

assignment=ID "=" expression;

definition of a function:

function=(FUNCTION_NAME|auxTab_or_array)" (" exprList ")";

definition of a list of expressions:

exprList=expression {"," expression};

definition of an expression:

expression=sum;

sum=product {("+"|"−") product};

product=power {("*"|"/")power};

power=sign {"^" sign};

sign={"+"|"−"} atom;

atom=function|ID numconst "(" expression ")".

It is evident that the definition of an expression is given by rules successively dependent on each other and using the definition of a function for the last one. It is therefore possible in any expression to make use of a function that itself uses expressions, which also use functions, and so on recursively.

The invention claimed is:
1. A financial product pricing system, comprising:
a computing processor;
computing memory communicatively coupled to the computing processor, the computing memory comprising executable instructions that, when executed by the system, cause the system to perform operations comprising:
transmitting for display a first user interface;
receiving into the computing system via the first user interface data that identify and describe the product, the data comprising: contextual data of the product, the contextual data indicating market variables involved in product pricing and used for selecting a market hypothesis for pricing the product, the contextual data comprising at least one valuation currency and at least one underlying instrument; and characteristic data of the product comprising a plurality of future financial flows associated with the product, the plurality of future financial flows defined using at least one numerical equation,
wherein receiving via the first user interface data that identify and describe the product comprises:
receiving in a first portion of the first user interface user inputs specifying a first term associated with the product and a first definition for the first term comprising a first numeric value;
receiving in the first portion of the first user interface user inputs specifying a second term associated with the product and a second definition for the second term comprising a second numeric value and a reference to the first term;
receiving in a second portion of the first user interface user inputs specifying a first financial flow associated with the product, the first financial flow specified with a start date for the first financial flow, a frequency of the first financial flow, and a description of the first financial flow defined using a numerical equation and at least one of the first term and the second term; and
receiving in the second portion of the first user interface user inputs specifying a second financial flow associated with the product, the second financial flow specified with a start date for the second financial flow, a frequency of the second financial flow, and a description of the second financial flow defined using a numerical equation and the first financial flow;
in the computing system generating a planned schedule from the received data that identify and describe the product, the planned schedule comprising for each of a plurality of future dates a financial flow associated with the product and defined using at least in part one of the first financial flow and the second financial flow;
transmitting for display a second user interface, the second user interface comprising a listing of the plurality of future dates and for each future date a financial flow associated with the product and defined using at least in part one of the first financial flow and the second financial flow;
in the system, storing in a first table information identifying the plurality of future dates and for each future date a financial flow defined using at least in part one of the first financial flow and the second financial flow;
in the computing system interpreting the schedule in order to identify product variables for the product on the basis of at least one of a first financial flow and a second, and for each date of the planned schedule, a function for calculating a price associated with the product as a function of at least one of the product variables;
in the system, storing in a second table information identifying for each date of the planned schedule, a function for calculating a price associated with the product;
in the system, storing in a third table the identified product variables;
in the computing system receiving market variables associated with the product and generated by a market analysis, the market variables identified for each of the plurality of dates on the schedule;
in the system, storing in a fourth table the received market values associated with the product;
in the computing system calculating using the market variables, for each of a plurality of market scenarios and for each of the plurality of dates on the schedule, product variable values; and
in the computing system calculating a product price as a function of the calculated product variable values.

2. A system according to claim 1, the computing memory further comprising executable instructions that, when executed by the system, cause the system to perform operations comprising: generating a compact script containing all the data needed for product pricing.

3. A system according to claim 2, the computing memory further comprising executable instructions that, when executed by the system, cause the system to perform operations comprising: inputting the data in compact script form.

4. A system according to claim 1, the computing memory further comprising executable instructions that, when executed by the system, cause the system to perform operations comprising: presenting acquisition windows, into which the contextual data and characteristic data can be entered separately.

5. A system according to claim 1, the computing memory further comprising executable instructions that, when executed by the system, cause the system to perform operations comprising: checking the interpretation of the schedule.

6. A system according to claim 1, the computing memory further comprising executable instructions that, when executed by the system, cause the system to perform operations comprising:
calculating, for each of the market scenarios and for each of the dates, the value of each of the market variables;
calculating, for each of the market scenario and for each of the dates, the product variable values as a function of the market variable values; and
calculating the price as a function of the product variable values in all the market scenarios.

7. A system according to claim 6, the computing memory further comprising executable instructions that, when executed by the system, cause the system to perform operations comprising: storing the market variable values in the form of tables (Tvvm).

8. A system according to claim 1, the computing memory further comprising executable instructions that, when executed by the system, cause the system to perform operations comprising: storing, in the form of tables, the schedule (T1), the calculation functions (T2), the product variables (T3), the market variables (T4), and the product variable values (Tvp).

9. A method implemented on a computing system for pricing a financial product, comprising:

transmitting for display a first user interface;

receiving into the computing system via the first user interface data that identify and describe the product, the data comprising: contextual data of the product, the contextual data indicating market variables involved in product pricing and used for selecting a market hypothesis for pricing the product, the contextual data comprising at least one valuation currency and at least one underlying instrument; and characteristic data of the product comprising a plurality of future financial flows associated with the product, the plurality of future financial flows defined using at least one numerical equation, wherein receiving via the first user interface data that identify and describe the product comprises:

receiving in a first portion of the first user interface user inputs specifying a first term associated with the product and a first definition for the first term comprising a first numeric value;

receiving in the first portion of the first user interface user inputs specifying a second term associated with the product and a second definition for the second term comprising a second numeric value and a reference to the first term;

receiving in a second portion of the first user interface user inputs specifying a first financial flow associated with the product, the first financial flow specified with a start date for the first financial flow, a frequency of the first financial flow, and a description of the first financial flow defined using a numerical equation and at least one of the first term and the second term; and receiving in the second portion of the first user interface user inputs specifying a second financial flow associated with the product, the second financial flow specified with a start date for the second financial flow, a frequency of the second financial flow, and a description of the second financial flow defined using a numerical equation and the first financial flow;

in the computing system generating a planned schedule from the received data that identify and describe the product, the planned schedule comprising for each of a plurality of future dates a financial flow associated with the product and defined using at least in part one of the first financial flow and the second financial flow;

transmitting for display a second user interface, the second user interface comprising a listing of the plurality of future dates and for each future date a financial flow associated with the product and defined using at least in part one of the first financial flow and the second financial flow;

in the system, storing in a first table information identifying the plurality of future dates and for each future date a financial flow defined using at least in part one of the first financial flow and the second financial flow;

in the computing system interpreting the schedule in order to identify product variables for the product on the basis of at least one of a first financial flow and a second financial flow, and for each date of the planned schedule, a function for calculating a price associated with the product as a function of at least one of the product variables;

in the system, storing in a second table information identifying for each date of the planned schedule, a function for calculating a price associated with the product;

in the system, storing in a third table the identified product variables;

in the computing system receiving market variables associated with the product and generated by a market analysis, the market variables identified for each of the plurality of dates on the schedule;

in the system, storing in a fourth table the received market values associated with the product;

in the computing system calculating using the market variables, for each of a plurality of market scenarios and for each of the plurality of dates on the schedule, product variable values; and in the computing system calculating a product price as a function of the calculated product variable values.

10. The method of claim 9, further comprising in the computer system generating a compact script containing all the data needed for product pricing.

11. The method of claim 10, further comprising in the computing system inputting data needed for product pricing in compact script form.

12. The method of claim 9, further comprising at the computing system presenting acquisition windows into which the contextual data and characteristic data can be entered separately.

13. The method of 9, further comprising in the computing system checking the interpretation of the schedule.

14. The method of claim 9, further comprising in the computing system:

calculating, for each of the market scenarios and for each of the dates, the value of each of the market variables;

calculating, for each of the market scenarios and for each of the dates, the product variable values as a function of the market variable values; and calculating the price as a function of the product variable values in all the market scenarios.

15. The method of claim 14, further comprising in the computing system storing the market variable values in the form of tables (Tvvm).

16. The method of claim 9, further comprising in the computing system storing, in the form of tables, the schedule (T1), the calculation functions (T2), the product variables (T3), the market variables (T4), and the product variable values (Tvp).

17. A method implemented on a computing system for pricing a financial product, comprising:

displaying a first user interface on the computing system, the first user interface adapted to receive data that identify and describe the product, the data comprising: contextual data of the product, the contextual data indicating market variables involved in product pricing and used for selecting a market hypothesis for pricing the product, the contextual data comprising at least one valuation currency and at least one underlying instrument; and characteristic data of the product comprising a plurality of future financial flows associated with the product, the plurality of future financial flows defined using at least one numerical equation;

receiving at the computing system via the first user interface contextual data of the product and characteristic data of the product, the receiving comprising:

receiving in a first portion of the first user interface user inputs specifying a first term associated with the product and a first definition for the first term comprising a first numeric value;

receiving in the first portion of the first user interface user inputs specifying a second term associated with the product and a second definition for the second term comprising a second numeric value and a reference to the first term;

receiving in a second portion of the first user interface user inputs specifying a first financial flow associated with the product, the first financial flow specified with a start date for the first financial flow, a frequency of the first financial flow, and a description of the first financial flow defined using a numerical equation and at least one of the first term and the second term; and receiving in the second portion of the first user interface user inputs specifying a second financial flow associated with the product, the second financial flow specified with a start date for the second financial flow, a frequency of the second financial flow, and a description of the second financial flow defined using a numerical equation and the first financial flow;

in the system generating a planned schedule from the received data that identify and describe the product, the planned schedule comprising for each of a plurality of future dates a financial flow associated with the product and defined using at least in part one of the first financial flow and the second financial flow;

displaying a second user interface on the computing system, the second user interface comprising a listing of the plurality of future dates and for each future date a product flow defined using at least in part one of the first financial flow and the second financial flow;

in the system, storing in a first table information identifying the plurality of future dates and for each of the plurality of future dates a financial flow defined using at least in part one of the first financial flow and the second financial flow;

in the system interpreting the schedule, in order to identify:

variables for the product on the basis of at least one of a financial flow, and for each date of the planned schedule, a function for calculating a price associated with the product as a function of at least one of the product variables;

in the system, storing in a second table information identifying for each date of the planned schedule, the function for calculating a price associated with the product;

in the system, storing in a third table information identifying the variables for the product;

in the system receiving market variables associated with the product and generated by a market analysis, the market variables identified for each of the plurality of dates on the schedule;

in the system, storing in a fourth table the market variables associated with the product and generated by a market analysis;

in the system calculating using the market variables, for each of a plurality of market scenarios and for each of the plurality of dates on the schedule, product variable values;

in the system, storing in a fifth table the product variable values; and in the system calculating a product price as a function of the calculated product variable values.

18. The method of claim 17, wherein the receiving market variables associated with the product and generated by a market analysis comprises receiving at least the following: a spot, an exchange rate, an interest rate, and information on counterparty default.

\* \* \* \* \*